United States Patent
Ohuchi

(10) Patent No.: US 11,537,308 B2
(45) Date of Patent: Dec. 27, 2022

(54) INFORMATION PROCESSING SYSTEM, INFORMATION PROCESSING DEVICE, STORAGE MEDIUM, AND INFORMATION PROCESSING METHOD OF DETECTING DESTRUCTION OF DATA DUE TO FILE TRANSFER

(71) Applicant: FUJITSU LIMITED, Kawasaki (JP)

(72) Inventor: Yoshio Ohuchi, Zumadu (JP)

(73) Assignee: FUJITSU LIMITED, Kawasaki (JP)

(*) Notice: Subject to any disclaimer, the term of this patent is extended or adjusted under 35 U.S.C. 154(b) by 183 days.

(21) Appl. No.: 17/003,300

(22) Filed: Aug. 26, 2020

(65) Prior Publication Data
US 2021/0064266 A1 Mar. 4, 2021

(30) Foreign Application Priority Data
Aug. 30, 2019 (JP) .............................. JP2019-157818

(51) Int. Cl.
*G06F 21/56* (2013.01)
*G06F 8/41* (2018.01)
(Continued)

(52) U.S. Cl.
CPC .......... *G06F 3/0647* (2013.01); *G06F 3/0604* (2013.01); *G06F 3/0676* (2013.01); *G06F 3/0679* (2013.01); *G06F 11/1004* (2013.01); *G06F 8/40* (2013.01); *G06F 8/75* (2013.01); *G06F 8/77* (2013.01); *G06F 9/44589* (2013.01); *G06F 11/3636* (2013.01);
(Continued)

(58) Field of Classification Search
CPC .... G06F 3/0647; G06F 3/0604; G06F 3/0676; G06F 3/0679; G06F 11/1004; G06F 8/75; G06F 8/40; G06F 8/77; G06F 21/565; G06F 11/3636; G06F 21/577; G06F 21/121; G06F 21/53; G06F 21/552; G06F 21/554; G06F 21/566; G06F 21/64; G06F 9/44589; H04L 67/06; H04L 67/12
See application file for complete search history.

(56) References Cited

U.S. PATENT DOCUMENTS 9,176,803 B2 * 11/2015 Biberdorf ............. G06F 11/073
2004/0098420 A1 * 5/2004 Peng .................... G06F 16/178
707/999.203
(Continued)

FOREIGN PATENT DOCUMENTS

JP 2005-182335 A 7/2005
JP 2007-272490 A 10/2007

OTHER PUBLICATIONS

Michael Salib et al., Starkiller: A Static Type Inferencer and Compiler for Python, May 2004, [Retrieved on Jul. 27, 2022]. Retrieved from the internet: <URL: https://dspace.mit.edu/bitstream/handle/1721.1/16688/57175336-MIT.pdf?sequence=2&isAllowed=y> 96 Pages (1-96) (Year: 2004).*

*Primary Examiner* — Anibal Rivera
(74) *Attorney, Agent, or Firm* — Fujitsu Patent Center

(57) ABSTRACT

An information processing device, includes a memory; and a processor coupled to the memory and configured to: generate second data by adding, to first data including a machine language, first machine language data that may be destroyed at a time of transfer of the first data and second machine language data that is not destroyed at the time of the transfer, and transmit the second data.

6 Claims, 12 Drawing Sheets

(51) Int. Cl.
  *G06F 21/60*  (2013.01)
  *G06F 3/06*  (2006.01)
  *G06F 11/10*  (2006.01)
  *G06F 21/12*  (2013.01)
  *H04L 67/06*  (2022.01)
  *G06F 21/55*  (2013.01)
  *G06F 21/57*  (2013.01)
  *G06F 21/53*  (2013.01)
  *H04L 67/12*  (2022.01)
  *G06F 9/445*  (2018.01)
  *G06F 8/40*  (2018.01)
  *G06F 8/75*  (2018.01)
  *G06F 8/77*  (2018.01)
  *G06F 11/36*  (2006.01)

(52) U.S. Cl.
  CPC ............ *G06F 21/121* (2013.01); *G06F 21/53* (2013.01); *G06F 21/552* (2013.01); *G06F 21/554* (2013.01); *G06F 21/565* (2013.01); *G06F 21/566* (2013.01); *G06F 21/577* (2013.01); *H04L 67/06* (2013.01); *H04L 67/12* (2013.01)

(56) References Cited

U.S. PATENT DOCUMENTS

2013/0191457 A1* 7/2013 Horsman ................ H04L 67/06
  709/204
2018/0285101 A1* 10/2018 Yahav ........................ G06F 8/40
2020/0082080 A1* 3/2020 Boulton ................ G06F 21/565

* cited by examiner

```
BEGINNING OF A
~
0000017C            PROLOGUEAD:
~
000001C1 00000000000000   db    0x00000000000000
000001C8            PIT:
000001C8 01000000   db    0x00000001
~
00000238 00000000   db    0x00000000
0000023C 00000000   db    0x00000000
00000240 71675144   db    "qgQD"
00000244 0a0d0000   db    lfcr 0x0000
00000248 41         dc    "A"
00000249            PLB.1
00000249 C745FC43424C20       mov    ss:ebp-04,204C4243
00000250 C705C800000000000000 mov    ds:000000C8,00000000
0000025A C705CC00000000000000 mov    ds:000000CC,00000000
00000264 B810000000           mov    eax,00000010
00000269 8945F8               mov    ss:ebp-08,eax
0000026C FFB5ACFFFFFF         push   ss:ebp+FFFFFFAC
00000272 55                   push   ebp
00000273 6800000000           push   00000000
00000278 6800000000           push   00000000
0000027D 68C8010000           push   000001C8
00000282 33C0                 xor    eax,eax
00000284 A004000000           mov    al,ds:00000004
00000289 50                   push   eax
0000028A FF75F8               push   ss:ebp-08
0000028D FF1504000000         call   JMP1PLAN
00000293 83C41C               add    esp,1C
             ⋮
```

ASCII CHARACTER DATA "qg" AND "QD" THAT ARE NOT CONVERTED AND LINE FEED CODE AND CARRIAGE RETURN CODE THAT ARE CONVERTED

RUNTIME: CALL FOR INITIALIZATION PROCESSING AT PROGRAM ENTRY

```
If('q'-'a'!= lf || 'Q'-'D' != cr)
{
    fprintf(stderr,"THE PROGRAM 'A' HAS BEEN CONVERTED BY
THE ASCII TRANSFER OF THE FTP AND IS DESTRUCTED.
PLEASE RETRY THE BINARY TRANSFER¥n");
    abort();
}
(NORMAL OPERATION AS BEFORE)
```

INFORMATION PROCESSING SYSTEM, INFORMATION PROCESSING DEVICE, STORAGE MEDIUM, AND INFORMATION PROCESSING METHOD OF DETECTING DESTRUCTION OF DATA DUE TO FILE TRANSFER

CROSS-REFERENCE TO RELATED APPLICATION

This application is based upon and claims the benefit of priority of the prior Japanese Patent Application No. 2019-157818, filed on Aug. 30, 2019, the entire contents of which are incorporated herein by reference.

FIELD

The present invention relates to an information processing system, an information processing device, a storage medium, and an information processing method.

BACKGROUND

There are various types of character codes for displaying characters on a computer, such as the American Standard Code for Information Interchange (ASCII) and the Extended UNIX (registered trademark) Code (EUC). A programmer who creates a computer program describes a processing procedure in a high-level language using one of such character codes and creates a source file. The computer uses a complier to interpret a high-level language command in the source file and converts a source program to a machine language object file.

In a case of large-scale system development in which many programmers participate, each of the programmers uploads the created source file and object file from a computer used by the programmer to a server. File transfer techniques such as the File Transfer Protocol (FTP) can be used for file upload. File transfer methods include a method of transferring a file as binary data and a transfer method for text data involving character code conversion. In a case where the file is transferred as binary data, the computer transmits the data as it is without changing the bit-by-bit data in the original file. On the other hand, when the transfer method involving character code conversion is used, the transmission source computer converts a character code in the file to be transmitted to a character code used by the transfer destination computer and transmits the file. In a case of a file in which a character code is described, such as a source file, when the file is transferred by the method involving character code conversion, a described character string can be correctly displayed on the transmission destination computer.

As a technique related to file transfer between computers, for example, a file transfer system that checks transfer of a file requested by a client to a server has been proposed. Furthermore, there has been proposed a transmission source device that transmits a file by the FTP, which can recognize whether the file that has arrived at a transmission destination device is defective. For example, Japanese Laid-open Patent Publication No. 2005-182335, Japanese Laid-open Patent Publication No. 2007-272490, and the like are disclosed as related arts.

SUMMARY

According to an aspect of the embodiments, an information processing device, includes a memory; and a processor coupled to the memory and configured to: generate second data by adding, to first data including a machine language, first machine language data that may be destroyed at a time of transfer of the first data and second machine language data that is not destroyed at the time of the transfer, and transmit the second data . . . .

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of an object file;

FIG. 6 is a diagram illustrating an example of a runtime module;

DESCRIPTION OF EMBODIMENTS

In principle, a machine language file such as an object file is transferred as binary data, but the machine language file may be erroneously transferred by a file transfer method involving character code conversion. In this case, a part of data of the machine language in the file may be converted. For example, in a case where a part of the binary data of the machine language has the same bit string as a character code to be converted in the file transfer involving character code conversion, a computer that performs the file transfer erroneously recognizes the corresponding part as the character code to be converted and converts the corresponding part. Hereinafter, conversion of machine language data at the time of the file transfer is called destruction of the machine language.

If the machine language is destroyed at the time of the file transfer, a program included in a transferred file cannot be executed normally. Moreover, there are various errors that occur when execution of the program ends abnormally due to the destruction of the machine language, and it is difficult to know from error contents that the machine language has been destroyed at the time of the file transfer. At this time, erroneous description cannot be found even if a mistake in creating the program is suspected and contents of a source file (character string in a high-level language) are checked. Therefore, contents of the machine language file (machine language code) are checked. The machine language code is difficult for humans, and it takes a lot of time for a human to check the machine language code. That is, in the case where the machine language has been destroyed at the time of the file transfer, it takes a huge amount of time and effort to know the fact.

In view of the above, it is desirable to be able to automatically detect the destruction of the machine language at the time of the file transfer.

Hereinafter, the present embodiment will be described with reference to the drawings. Note that, each of embodiments may be implemented in combination of a plurality of the embodiments within a scope without contradiction.

First Embodiment

First, a first embodiment will be described. The first embodiment is an information processing system capable of automatically detecting destruction of a machine language at the time of file transfer.

Figure 1:
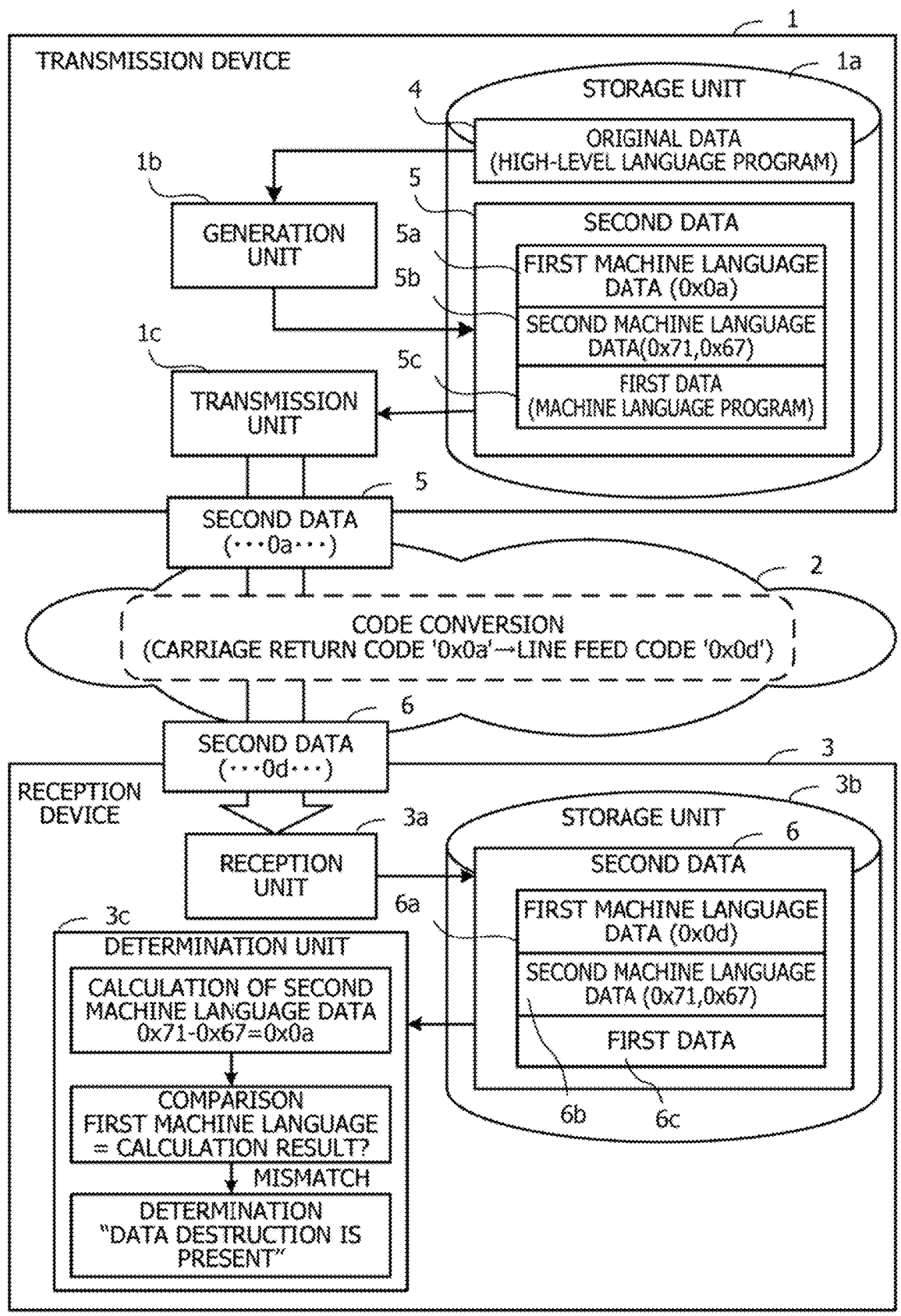
FIG. 1 is a diagram illustrating an example of an information processing method by an information processing system according to a first embodiment.

FIG. 1 is a diagram illustrating an example of an information processing method by an information processing system according to a first embodiment. FIG. 1 illustrates an information processing method for automatically detecting destruction of a machine language at the time of file transfer from a transmission device 1 to a reception device 3. The transmission device 1 and the reception device 3 are, for example, information processing devices. The transmission device 1 and the reception device 3 are connected via a network 2.

The transmission device 1 and the reception device 3 execute predetermined processing, so that the destruction of the machine language at the time of the file transfer can be automatically detected. For example, the transmission device 1 executes an information processing program in which a procedure of processing executed by the transmission device 1 is described in order to automatically detect the destruction of the machine language at the time of the file transfer. Similarly, the reception device 3 executes an information processing program in which a procedure of processing executed by the reception device 3 is described in order to automatically detect the destruction of the machine language at the time of the file transfer.

The transmission device 1 includes a storage unit 1a, a generation unit 1b, and a transmission unit 1c. The storage unit 1a is, for example, a memory or a storage device included in the transmission device 1. The generation unit 1b is, for example, a processor or an arithmetic circuit included in the transmission device 1. The transmission unit 1c is, for example, a communication interface included in the transmission device 1.

The storage unit 1a stores, for example, original data 4 and second data 5 generated by the generation unit 1b based on the original data 4. The original data 4 is, for example, a program described in a high-level language.

The generation unit 1b generates the second data 5 based on the original data 4. The generation unit 1b generates first data 5c by converting a command in the program shown in the original data 4 to the machine language, for example. The first data 5c is a machine language program. Furthermore, the generation unit 1b generates the second data 5 by adding, to the first data 5c including the machine language, first machine language data 5a that may be destroyed at the time of transfer of the first data 5c and second machine language data 5b that is not destroyed at the time of the transfer. The first machine language data 5a is, for example, data including a carriage return code "0x0a". The second machine language data 5b includes, for example, a plurality of data. For example, the generation unit 1b includes, in the second machine language data 5b, data of a first value and a second value whose difference from the first value is equal to a value of the first machine language data 5a. The first value and the second value are, for example, character codes of characters to which the same character code is assigned even if character code systems are different. In a case where the first machine language data 5a is the carriage return code "x0a" and, for example, the first value is a character code "0x71" of a half-width "q", the second value is a character code "0x67" of a half-width "g".

The generation unit 1b may add, to the second data 5, processing of determining whether the machine language has been destroyed by data transfer. For example, the generation unit 1b adds determination processing "if (carriage return code value 0a*('q'−'g'))" to the second data 5.

The transmission unit 1c transmits the second data 5 to the reception device 3 via the network 2. At this time, the second data 5 may be relayed by a device other than the transmission device 1 and the reception device 3 in the network 2. Furthermore, in the second data 5, a predetermined code (array of bit values) in the second data 5 may be converted to another code by the relay device. For example, the carriage return code "0x0a" may be converted to a line feed code "0x0d". Therefore, second data 6 after the transfer is not always the same as the second data 5 before the transfer.

The reception device 3 includes a reception unit 3a, a storage unit 3b, and a determination unit 3c. The reception unit 3a is, for example, a communication interface included in the reception device 3. The storage unit 3b is, for example, a memory or a storage device included in the reception device 3. The determination unit 3c is, for example, a processor or an arithmetic circuit included in the reception device 3.

The reception unit 3a receives the second data 6 that may have undergone code conversion at the time of the transfer via the network 2. The reception unit 3a stores the received second data 6 in the storage unit 3b, for example.

The storage unit 3b stores the second data 6. Note that the second data 6 includes first machine language data 6a, second machine language data 6b, and first data 6c.

The first machine language data 6a in the received second data 6 is data corresponding to the first machine language data 5a in the second data 5 before transmission. If the code conversion is not performed at the time of the data transfer, the first machine language data 6a in the second data 6 has the same value as the first machine language data 5a in the second data 5. If the code conversion is performed at the time of the data transfer, the first machine language data 6a in the second data 6 has a different value from the first machine language data 5a in the second data 5.

The second machine language data 6b in the received second data 6 is data corresponding to the second machine language data 5b in the second data 5 before transmission. Regardless of whether the code conversion is not performed at the time of the data transfer, the second machine language data 6b in the second data 6 has the same value as the second machine language data 5b in the second data 5.

The first data 6c in the received second data 6 is data corresponding to the first data 5c in the second data 5 before transmission. If the code conversion is not performed at the time of the data transfer, the first data 6c in the second data 6 has the same value as the first data 5c in the second data 5. If the code conversion is performed at the time of the data transfer, the first data 6c in the second data 6 may be partially different from the first data 5c in the second data 5.

The determination unit 3c determines whether the first data 6c is destroyed based on comparison results between the first machine language data 6a and the second machine language data 6b included in the second data 6. For example, the determination unit 3c compares the first machine language data with data calculated based on a plurality of data included in the second machine language data to obtain the comparison results.

For example, the second data 5 includes the first value and the second value whose difference from the first value is equal to the value of the first machine language data 5a. In this case, the determination unit 3c compares a difference between the first value and the second value included in the second machine language data 6b with the value of the first machine language data 6a to obtain the comparison results. The determination unit 3c can execute such determination processing based on, for example, the determination processing "if (carriage return code value 0a*('q'−'g'))" added to the second data 5 by the generation unit 1b.

The determination unit 3c determines that the first data 6c is destroyed if the comparison results do not match, for example. Furthermore, the determination unit 3c determines that the first data 6c is not destroyed if the comparison results match, for example. In the case where the determination unit 3c determines that the first data 6c is destroyed, the determination unit 3c Inhibits execution of a machine language command in the first data 6c included in the second data 6, for example.

In the case where the determination unit 3c determines that the first data 6c is destroyed, the determination unit 3c may output a message indicating that the data has been destroyed. For example, the determination unit 3c displays a message "destroyed by the FTP" and stops the execution of the processing based on the second data 6.

According to such an information processing system, in a case where the code conversion of the second data 5 is performed while the second data 5 is transferred via the network 2, the presence or absence of the destruction of the machine language data due to the code conversion is automatically detected. For example, it is assumed that the transmission device 1 uses the carriage return code "0x0a" for a line feed of a character string, and the reception device 3 uses the line feed code "0x0d" for a line feed of a character string. At this time, for example, the FTP can be used as a data transfer technique from the transmission device 1 to the reception device 3. The FTP has a transfer mode called ASCII mode for transferring text data.

When data is transferred in the ASCII mode, a part of codes are converted so that the transferred text data can be read even between devices with different code systems. The machine language data should not be transferred in the ASCII mode, but if the ASCII mode is erroneously set in a device that relays the data, the same bit string as a code to be converted in the machine language data is converted to a different value. For example, the carriage return code "0x0a" is converted to the line feed code "0x0d".

Therefore, the generation unit 1b of the transmission device 1 includes, in the second data 5, the first machine language data 5a (for example, "0x0a") that may be destroyed and the second machine language data 5b that is not destroyed (for example, "0x71" and "0x67"). When the second data 5 is transmitted from the transmission unit 1c and received by the reception device 3 via the network 2, the first machine language data 5a (for example, "0x0a") is converted to another value (for example, "0x0d") if the code conversion is performed.

In the reception device 3, the determination unit 3c performs a calculation using the second machine language data 6b (for example, calculation of a difference between two codes). Note that the second machine language data 6b is data that is not destroyed even if the code conversion processing is performed at the time of the data transfer, and thus can be calculated as intended. When the second machine language data 6b includes "x71" and "0x67", the difference is "Oxa". The determination unit 3c compares a calculation result (for example, "0x0a") with the first machine language data 6a (for example, "0x0d"). If the code conversion is performed during the data transfer, the data do not match in the comparison. If the data do not match, the determination unit 3c determines that the data is destroyed. If the code conversion is not performed during the data transfer, the data match in the comparison. If the data match, the determination unit 3c determines that the data is not destroyed.

As described above, it is possible to automatically detect the presence or absence of the destruction of the data at the time of the data transfer. By automatically detecting the presence or absence of the destruction of the data at the time of the data transfer, for example, even in a case where the data has been erroneously transferred in the ASCII mode at the time of the data transfer, it is easy to investigate the reason why the processing using the transferred second data 6 does not operate normally.

Moreover, the determination unit 3c uses the second machine language data 6b that is not destroyed even if the code conversion processing is performed at the time of the data transfer in determining the presence or absence of the destruction of the machine language data. Therefore, even in a case where the first machine language data 6a has been converted to a value different from the original first machine language data 5a, the second machine language data 6b keeps the same value as the second machine language data 5b. However, in order that the second machine language data 5b is data that is not destroyed at the time of the transfer, the same value as the first machine language data 5a cannot be used as the value of the second machine language data 5b. Therefore, the determination unit 3c calculates the same value as the first machine language data 5a by a predetermined calculation using the second machine language data 6b, to determine the presence or absence of the destruction of the machine language data. As described above, the determination unit 3c determines the presence or absence of the destruction of the machine language data by using the second machine language data 6b that is not destroyed at the time of the transfer, and thus can reliably determine the presence or absence of the destruction.

Furthermore, in a case where the determination unit 3c determines that there is the destruction of the data, the determination unit 3c inhibits the execution of the machine language command included in the first data 6c, and thus can inhibit the execution of unintended processing in the reception device 3.

Second Embodiment

Next, a second embodiment will be described. In the second embodiment, a computer system used for software development can easily detect erroneously transferring a program file described in a machine language in an ASCII mode of the FTP.

Figure 2:
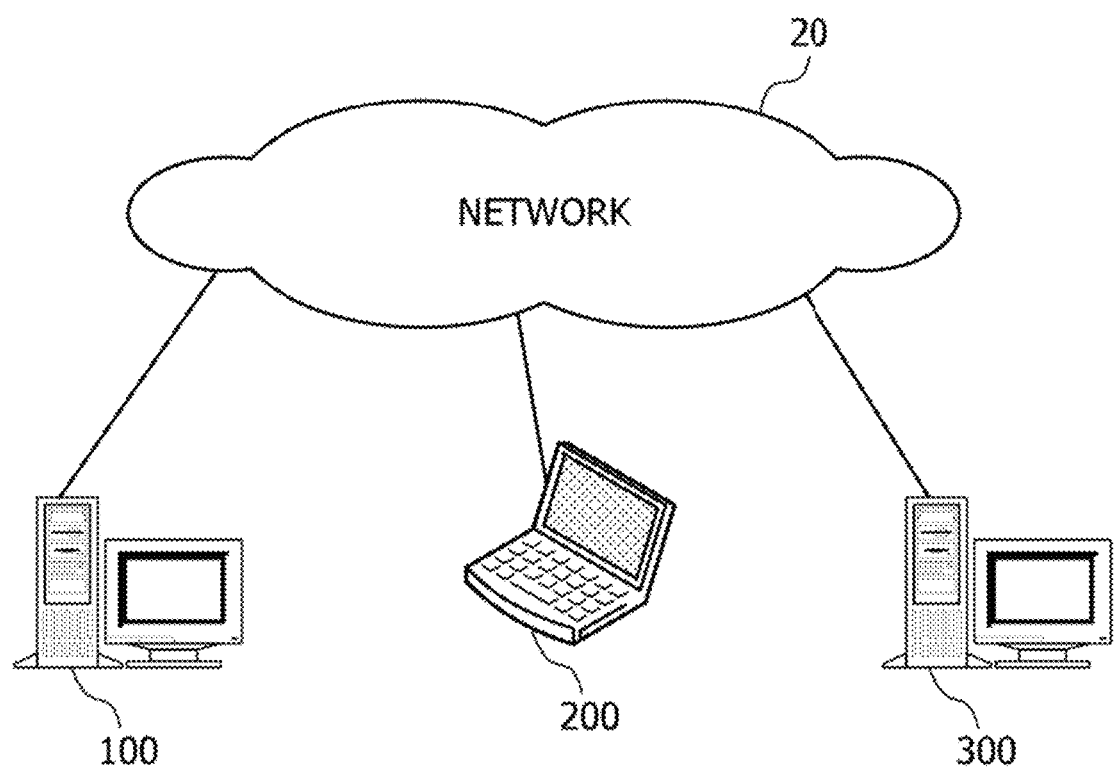
FIG. 2 is a diagram illustrating a system configuration example according to a second embodiment.

FIG. 2 is a diagram illustrating a system configuration example according to the second embodiment. In the example of FIG. 2, a development computer 100, a file management computer 200, and an operating environment computer 300 are connected via a network 20.

The development computer 100 is a computer used by a programmer to develop software. The programmer describes a program in a high-level language such as COBOL or C++ by using the development computer 100 to create a source file. The development computer 100 compiles the created source file and generates an object file described in the machine language.

The file management computer 200 is a computer used to manage files (including source files and object files) created in the system. For example, a software development manager inputs an instruction to download the source file or the object file created by the programmer to the file management computer 200. The file management computer 200 acquires, in accordance with the instruction, the source file or the object file from the development computer 100 by using the FTP.

In a case of executing the downloaded object file in an operating environment, the manager inputs, to the file management computer 200, an instruction to upload the object file to the operating environment computer 300. The file management computer 200 transmits, in accordance with the instruction, the object file to the operating environment computer 300 by using the FTP. Note that the file management computer 200 can also continuously acquire the object file from the development computer 100 and transmit the object file to the operating environment computer 300 in response to an instruction to transfer the object file.

The operating environment computer 300 is a computer having an execution environment for the created object file. For example, the operating environment computer 300 has a runtime module used to execute the object file.

Next, a hardware configuration of the computer will be described.

Figure 3:
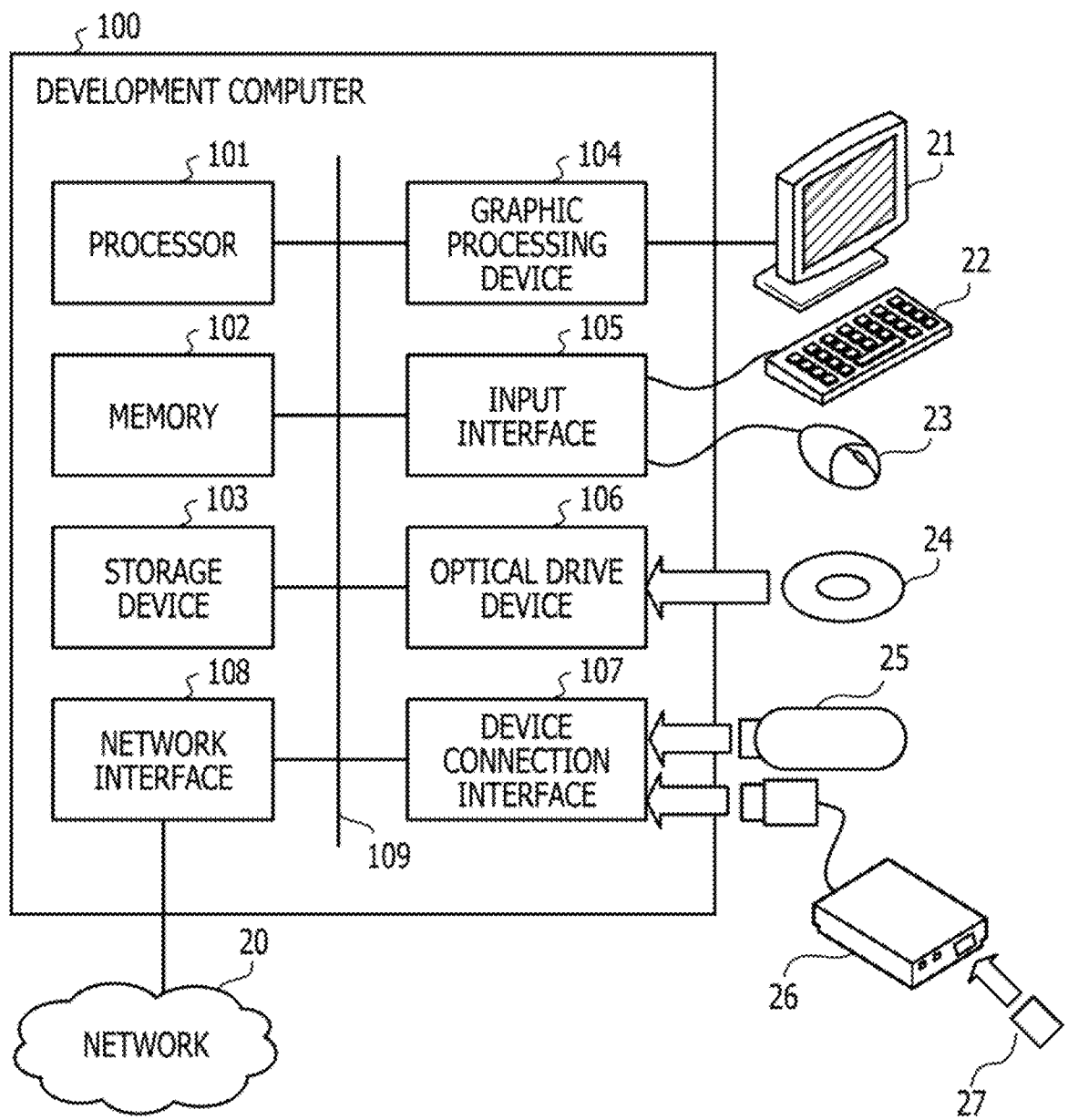
FIG. 3 is a diagram illustrating a configuration example of hardware of a development computer.

FIG. 3 is a diagram illustrating a configuration example of hardware of the development computer. The entire device of the development computer 100 is controlled by a processor 101. To the processor 101, a memory 102 and a plurality of peripheral devices are connected via a bus 109. The processor 101 may also be a multiprocessor. The processor 101 is, for example, a central processing unit (CPU), a micro processing unit (MPU), or a digital signal processor (DSP). At least a part of functions implemented by execution of a program by the processor 101 may be implemented by an electronic circuit such as an application specific integrated circuit (ASIC) and a programmable logic device (PD).

The memory 102 is used as a main storage device of the development computer 100. The memory 102 temporarily stores at least a part of an operating system (OS) program and an application program to be executed by the processor 101. Furthermore, the memory 102 stores various data used in processing by the processor 101. As the memory 102, for example, a volatile semiconductor storage device such as a random access memory (RAM) is used.

The peripheral devices connected to the bus 109 include a storage device 103, a graphic processing device 104, an input interface 105, an optical drive device 106, a device connection interface 107, and a network interface 108.

The storage device 103 writes and reads data electrically or magnetically in and from a built-in recording medium.

The storage device 103 is used as an auxiliary storage device of the computer. The storage device 103 stores the OS program, the application program, and various data. Note that, as the storage device 103, for example, a hard disk drive (HDD) or a solid state drive (SSD) may be used.

To the graphic processing device 104, a monitor 21 is connected. The graphic processing device 104 displays an image on a screen of the monitor 21 in accordance with a command from the processor 101. Examples of the monitor 21 include a display device using an organic electro luminescence (EL), a liquid crystal display device, and the like.

To the input interface 105, a keyboard 22 and a mouse 23 are connected. The input interface 105 transmits signals transmitted from the keyboard 22 and the mouse 23 to the processor 101. Note that the mouse 23 is an example of a pointing device, and other pointing devices may also be used. Examples of the other pointing devices include a touch panel, a tablet, a touch pad, a track ball, and the like.

The optical drive device 106 reads data recorded on an optical disc 24 by using laser light or the like. The optical disc 24 is a portable recording medium on which the data is recorded so as to be readable by reflection of light. Examples of the optical disc 24 include a digital versatile disc (DVD), a DVD-RAM, a compact disc read only memory (CD-ROM), a CD-recordable (R)/rewritable (RW), and the like.

The device connection interface 107 is a communication interface for connecting the peripheral devices to the development computer 100. For example, to the device connection interface 107, a memory device 25 and a memory reader/writer 26 may be connected. The memory device 25 is a recording medium equipped with a communication function with the device connection interface 107. The memory reader/writer 26 is a device that writes data in a memory card 27 or reads data from the memory card 27. The memory card 27 is a card type recording medium.

The network interface 108 is connected to the network 20. The network interface 108 exchanges data with another computer or a communication device via the network 20.

The development computer 100 may implement a processing function of the second embodiment with the hardware configuration as described above. Note that the file management computer 200 and the operating environment computer 300 can also be implemented by hardware similar to the development computer 100. Furthermore, the transmission device 1 and the reception device 3 shown in the first embodiment can also be implemented by hardware similar to the development computer 100 illustrated in FIG. 3.

The development computer 100 implements the processing function of the second embodiment by executing, for example, a program recorded on a computer-readable recording medium. The program in which processing contents to be executed by the development computer 100 are described may be recorded on various recording media. For example, the program to be executed by the development computer 100 may be stored in the storage device 103. The processor 101 loads at least a part of the program in the storage device 103 on the memory 102 and executes the program. It is also possible to record the program to be executed by the development computer 100 on a portable recording medium such as the optical disc 24, the memory device 25, and the memory card 27. The program stored in the portable recording medium can be executed after being installed on the storage device 103, for example, under control of the processor 101. The processor 101 may also read the program directly from the portable recording medium and execute the program.

Similarly to the development computer 100, the operating environment computer 300 also implements the processing function of the second embodiment by executing, for example, a program recorded on a computer-readable recording medium.

Software development is performed by use of the system having the configuration as described above. For example, a program is created on the development computer 100, and the created program is transferred to the operating environment computer 300 by the file management computer 200. The operating environment computer 300 then executes the created software and confirms whether the software operates as designed.

As described above, in the case where the file management computer 200 is provided separately from the development computer 100 and the operating environment computer 300, character codes of OSs of all the computers are not necessarily the same. For example, there is a case where the development computer 100 and the operating environment computer 300 operate on UNIX (registered trademark) OS systems and the file management computer 200 operates on a WINDOWS (registered trademark) OS. The UNIX (registered trademark) OS often uses the EUC as the character code. The WINDOWS (registered trademark) OS often uses the Shift_JIS as the character code.

For example, there is a case where application software useful for file management are compatible only with the WINDOWS (registered trademark) OS. Therefore, even if the development computer 100 and the operating environment computer 300 operate on the UNIX (registered trademark) OSs, it may be convenient for a user to perform the file management by the file management computer 200 operating on the WINDOWS (registered trademark) OS.

In the second embodiment, it is assumed that the character codes of the development computer 100 and the operating environment computer 300 are the EUCs, and the character code of the file management computer 200 is the Shift_JIS.

In addition, the FTP is often used to transfer files between computers. In the FTP, it is assumed that the character codes of the OSs are not uniform, a binary mode and an ASCII mode are prepared as transfer modes. The binary mode is a mode for transferring a binary file. In the binary mode, data transfer is performed while binary data in an original file is not changed. The ASCII mode is a mode for transferring a text file. In the ASCII mode, the data transfer is performed while the character code is converted in accordance with an environment of a file transfer destination.

When an object file converted to the machine language by the development computer 100 is transferred by the FTP from the development computer 100 to the operating environment computer 300 via the file management computer 200, the object file should originally be transferred in the binary mode. However, the object file may be transferred in the ASCII mode due to an erroneous operation by a user. When a machine language file is transferred in the ASCII mode, a machine language code that matches a predetermined character code such as a line feed code included in the object file is converted to another code. As a result, the machine language is destroyed.

As a detection mechanism for detecting destruction of a machine language file in the operating environment computer 300, for example, there is a detection mechanism for detecting destruction of an Executable and Linkable Format (ELF) header. The ELF header is file management information provided at the beginning of a compiled file. In a case where a data structure of the ELF header is destroyed, the operating environment computer 300 can detect destruction of the machine language. However, in a case where a part of machine language codes in the object file are unintentionally converted, the destruction of the machine language due to the conversion cannot be detected by destruction detection of the ELF header.

It cannot be seen what kind of a trouble such as a sigsegv (address reference exception) and an operation result error will occur if the object file is executed with the machine language code destroyed. Usually, 99% or more of trouble events such as the sigsegv and the operation result error are caused by an error in program description. Therefore, a user usually confirms whether a source code of a program is correct. However, in a case where the cause is conversion of the code at the time of the transfer of the object file, the program error cannot be found even if the source code is checked. Therefore, the user visually compares, byte by byte, a translation list (machine language list) generated by a compiler with a machine language extracted from the machine language file by using an mdb command (debugger). For example, the user visually compares all the tens of millions of bytes of the machine language to be compared. Therefore, it takes a lot of time to find the destruction of the machine language due to the FTP transfer, which is the cause.

Therefore, the system according to the second embodiment is provided with a detection mechanism capable of automatically detecting the presence or absence of code conversion at the time of the file transfer.

Figure 4:
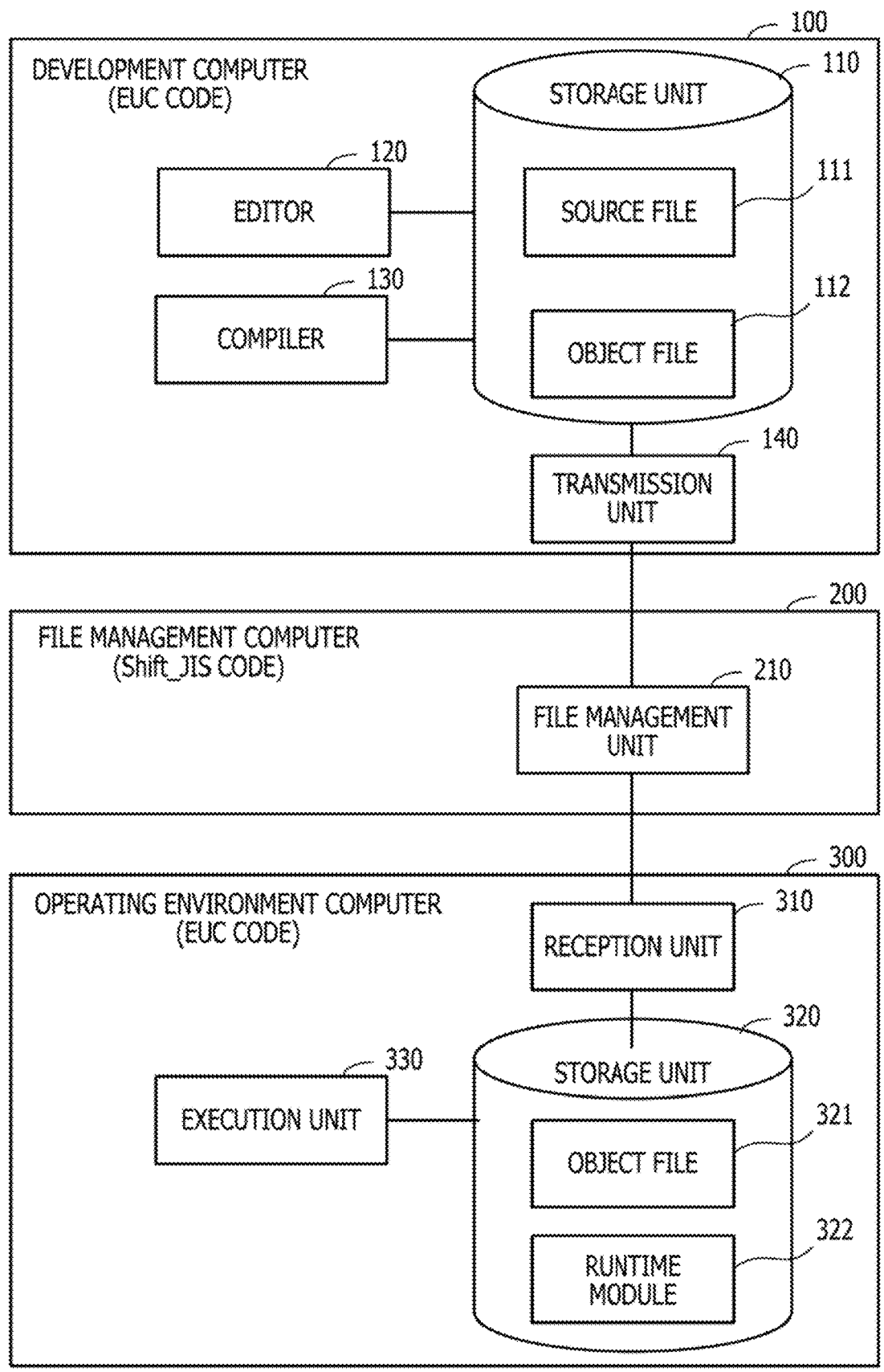
FIG. 4 is a block diagram illustrating functions for implementing a detection mechanism for detecting the presence or absence of code conversion at the time of file transfer.

FIG. 4 is a block diagram illustrating functions for implementing the detection mechanism for detecting the presence or absence of the code conversion at the time of the file transfer. The development computer 100 includes a storage unit 110, an editor 120, and a compiler 130.

The storage unit 110 stores a source file 111, an object file 112, and the like.

The source file 111 is a program file described in a high-level language. The source file 111 is created, for example, by a programmer using programming software such as an editor.

The object file 112 is a machine language program file generated by compiling the source file 111. The object file 112 includes destruction detection data. The destruction detection data is information embedded in the object file 112 for the purpose of detecting the destruction of the machine language. The detection data for destruction includes a code that is converted and a code that is not converted in a case where the character code is converted at the time of transfer of the object file 112 by the FTP.

The editor 120 receives an input of a command statement in the high-level language and generates the source file 111. The editor 120 stores the generated source file 111 in the storage unit 110.

The compiler 130 compiles the source file 111. For example, the compiler 130 interprets a high-level language command described in the source file 111 and generates a machine language command for causing the computer to execute the command. The compiler 130 writes the generated machine language command in the object file 112. Furthermore, the compiler 130 inserts the destruction detection data at a predetermined position in the object file 112.

A transmission unit 140 transmits the source file 111 or the object file 112 to the file management computer 200 in accordance with a request from the file management computer 200.

Note that the development computer 100 is an example of the transmission device 1 shown in the first embodiment. The storage unit 110 is an example of the storage unit 1a shown in the first embodiment. The compiler 130 is an example of the generation unit 1b shown in the first embodiment. The transmission unit 140 is an example of the transmission unit 1c shown in the first embodiment.

The file management computer 200 includes a file management unit 210. The file management unit 210 manages the source file 111 and the object file 112 generated during a software development process. For example, the file management unit 210 acquires the object file 112 from the development computer 100 in accordance with an instruction from a user. The file management unit 210 can also transfer the acquired object file 112 to the operating environment computer 300. The file management unit 210 implements the acquisition of the object file 112 from the development computer 100 and the transmission of the object file 112 to the operating environment computer 300 by the FTP.

The operating environment computer 300 includes a reception unit 310, a storage unit 320, and an execution unit 330.

The reception unit 310 receives an object file 321 from the file management computer 200. The reception unit 310 stores the received object file 321 in the storage unit 320.

The storage unit 320 stores the object file 321 and a runtime module 322. The object file 321 is a machine language program file transmitted from the development computer 100 via the file management computer 200. The runtime module 322 is a machine language program file used to execute the object file 321.

The execution unit 330 executes the object file 321 in accordance with an instruction from a user. Note that the execution unit 330 executes the runtime module 322 when the runtime module 322 is called by a command in the object file 321.

Note that the operating environment computer 300 is an example of the reception device 3 shown in the first embodiment. The reception unit 310 is an example of the reception unit 3a shown in the first embodiment. The storage unit 320 is an example of the storage unit 3b shown in the first embodiment. The execution unit 330 is an example of the determination unit 3c shown in the first embodiment.

Lines connecting the respective elements illustrated in FIG. 4 indicate a part of a communication path, and a communication path other than the illustrated communication path may also be set. Furthermore, the function of each element illustrated in FIG. 4 may be implemented, for example, by allowing the computer to execute a program module corresponding to the element.

Next, the object file in which the destruction detection data is written will be described.

FIG. 5 is a diagram illustrating an example of the object file. FIG. 5 illustrates the example in which the object file 112 is displayed by a binary editor. A first item on each line indicates a position of data in the file (the number of bytes from the beginning of the file). In addition, a second item on each line is a hexadecimal value of the binary data described in the corresponding position. That is, the value shown in the second item is actual binary data included in the object file 112. Third and fourth items on each line are meanings of commands shown on each line, which are interpreted by the binary editor.

For example, in the object file 112, "71675144" is described from a 240th byte (position "00000240") in the hexadecimal number. This is a character code for each of half-width characters 'q'(71), 'g'(67), 'Q' (51), and 'D' (44), which are not converted at the time of the file transfer in the ASCII mode of the FTP.

For example, the character code of half-width 'q' is "71" in both the EUC and the Shift_JIS, and the code conversion is not performed even if the file transfer is performed in the ASCII mode.

In the object file 112, "0a0d0000" is described from a 244th byte (position "00000244") in the hexadecimal number. This is a line feed (LF: Line Feed) code (0a) and a carriage return (CF: Carriage Return) code (0d), which are converted at the time of the file transfer in the ASCII mode of FTP.

"71675144" at the position "00000240" and "0a0d0000" at the position "00000244" are the destruction detection data written in the object file 112.

In the object file 112, "FF1504000000" is described from a 28Dth byte (position "0000028D") in the hexadecimal number. This is a call command for a runtime that performs initialization processing at a program entry. The called runtime is a program included in the runtime module 322.

By generating the object file 112 as described above, it is possible to detect the presence or absence of the destruction of the machine language when the object file 112 is transferred by the FTP. A procedure for detecting the presence or absence of the destruction of the machine language is described in the runtime module 322.

FIG. 6 is a diagram illustrating an example of the runtime module. For example, the runtime module 322 includes a branch command "If (('q'-'a' !=If ||'Q'-'D' !=cr)". This means that a condition of the IF statement is true when either "'q'-'a' !=If" or "'Q'-'D' !=cr" is satisfied. "'q'-'a' !=If" is a condition that a result obtained by subtracting a character code of a half-width "a" from the character code of the half-width "q" does not match the code of "If". The code of "If" at this time is first byte data from the position "00000244" of the object file 112. "'Q'-'D' !=cr" is a condition that a result obtained by subtracting the character code of the half-width "D" from the character code of the half-width "Q" does not match the code of "cr". The code of "cr" at this time is second byte data at the position "00000244" of the object file 112.

The runtime module 322 describes displaying, by "fprintf( )", a message indicating that the machine language has been destroyed and aborting the execution of the object file by "abort( )" in a case where the condition of the IF statement is true.

In the operating environment computer 300, the execution unit 330 uses the runtime module 322 as described above to perform the initialization processing when executing the object file 321 transferred by the FTP. As a result, in a case where the machine language of the object file 321 has been destroyed at the time of the file transfer, the destruction is detected at the time of the initialization processing, and the execution of the object file 321 is aborted.

Hereinafter, a procedure of destruction detection processing of the machine language involved in the file transfer will be described in detail.

Figure 7:
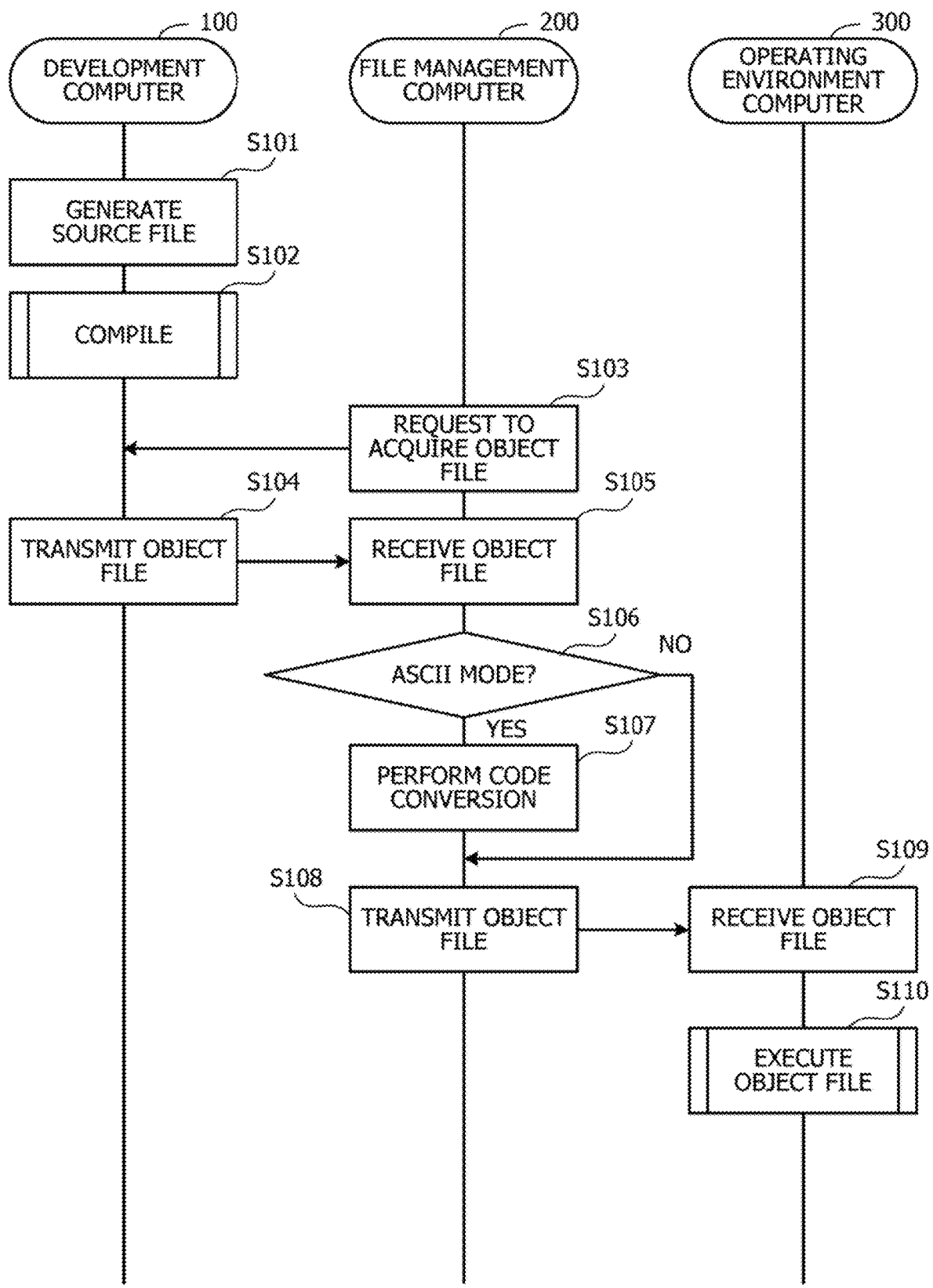
FIG. 7 is a sequence diagram illustrating an example of a file transfer procedure.

FIG. 7 is a sequence diagram illustrating an example of a file transfer procedure. In the development computer 100, when a user inputs a command statement in the high-level language to the editor 120, the editor 120 generates the source file 111 (step S101). After that, the compiler 130 compiles the source file 111 in accordance with a compile instruction from the user to generate the machine language object file 112 (step S102). At this time, the compiler 130 includes the destruction detection data in the object file 112. Details of the compiling processing will be described later (see FIG. 8).

After that, the user inputs, to the file management unit 210 of the file management computer 200, an instruction to transfer the object file 112 from the development computer 100 to the operating environment computer 300. At this time, the user specifies whether a mode used for the file transfer by the FTP is the binary mode or the ASCII mode. In response to the input of the transfer instruction, the file management unit 210 transmits a request for acquiring the object file to the development computer 100 (step S103). The transmission unit 140 of the development computer 100 then transmits the object file 112 by the FTP (step S104).

The file management unit 210 of the file management computer 200 receives the object file 112 (step S105). Next, the file management unit 210 determines whether the file transfer mode is the ASCII mode (step S106). If the file transfer mode is the ASCII mode, the file management unit 210 performs code conversion of the object file 112 (step S107). For example, the file management unit 210 searches the object file 112 for a code that matches the carriage return code (LF), and converts the corresponding code to the line feed code (CR+LF) in the OS of the file management computer 200.

Note that the file management unit 210 skips the code conversion processing (step S107) if the file transfer mode is the binary mode. After that, the file management unit 210 transmits the object file 321 to the operating environment computer 300 (step S108).

In the operating environment computer 300, the reception unit 310 receives the object file 321 (step S109). After that, when the user inputs an instruction to execute the object file 321, the execution unit 330 executes the object file 321 (step S110). Details of the object file execution processing will be described later (see FIG. 10).

As illustrated in FIG. 7, the file management unit 210 performs the code conversion if the ASCII mode is specified at the time of the transfer of the object file 112. However, the object file 112 is described in the machine language and is a file to be transferred in the binary mode. When the object file 112 is transferred in the ASCII mode, the code in the object file 112 is rewritten and the machine language is destroyed. In order to detect such destruction of the machine language, the destruction detection data is written in the object file 112 at the time of the compilation.

Figure 8:
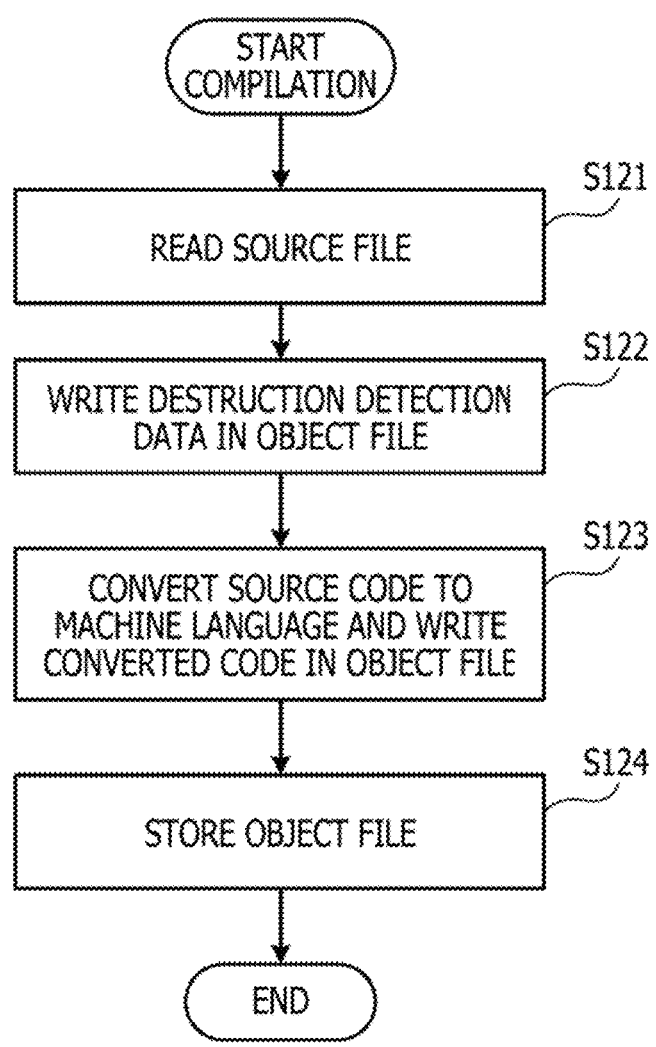
FIG. 8 is a flowchart illustrating an example of a procedure of compiling processing.

FIG. 8 is a flowchart illustrating an example of a procedure of the compiling processing. Hereinafter, processing illustrated in FIG. 8 will be described along step numbers.

[Step S121] The compiler 130 reads the source file 111 from the storage unit 110.

[Step S122] The compiler 130 writes the destruction detection data in the object file 112.

[Step S123] The compiler 130 converts the source code in the source file 111 to the machine language and writes the converted code in the object file 112.

[Step S124] The compiler 130 stores the object file 112 in the storage unit 110.

As described above, the compiler 130 generates the object file 112 incorporating the destruction detection data.

Figure 9:
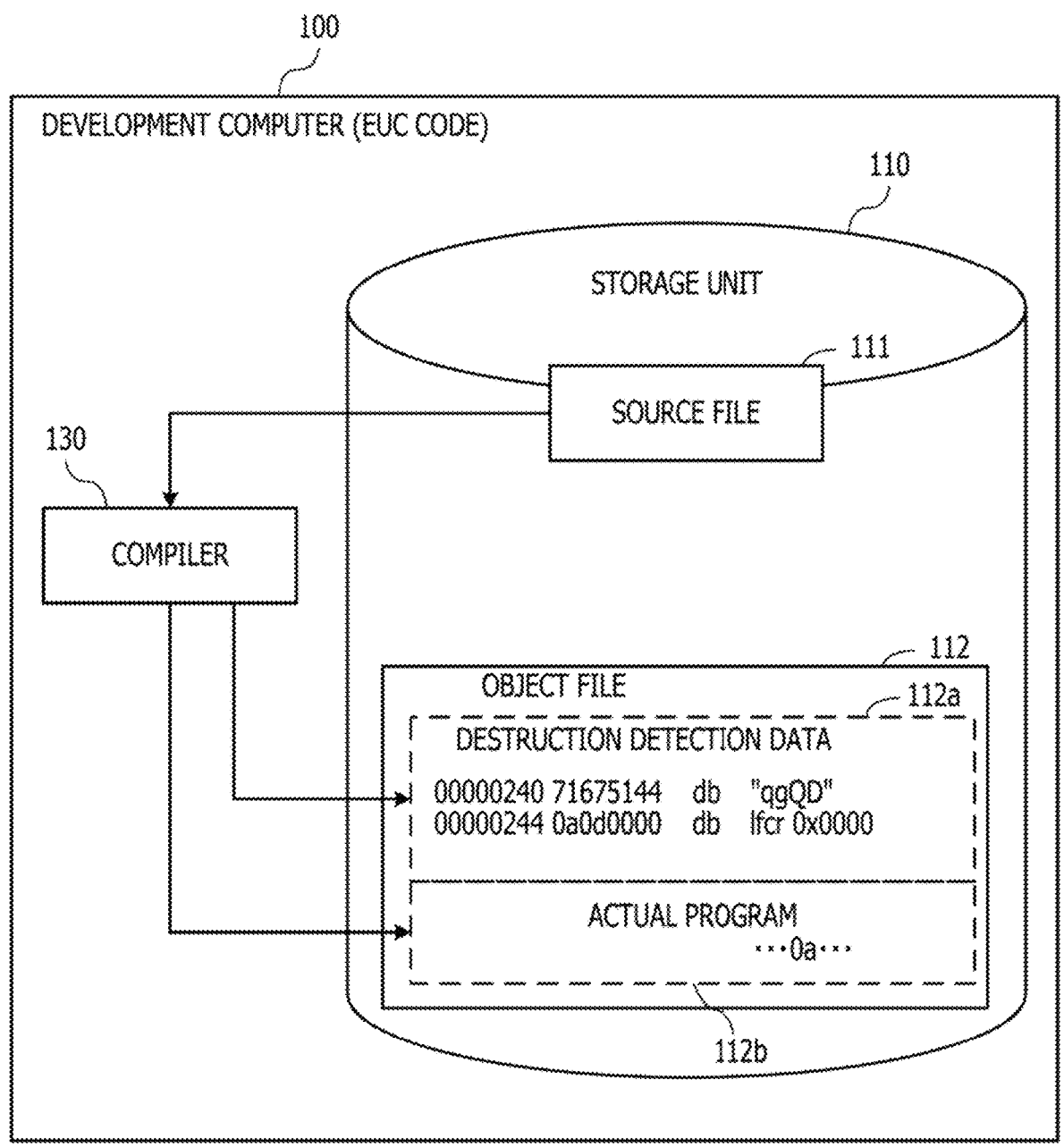
FIG. 9 is a diagram illustrating an example of the object file.

FIG. 9 is a diagram illustrating an example of the object file. As illustrated in FIG. 9, the object file 112 includes destruction detection data 112a prepared in advance. In the object file 112, an actual program 112b that is a machine language program generated based on the source file 111 is written after the destruction detection data 112a. Since the destruction detection data 112a is written before the actual program 112b, when the object file 112 is executed, a command shown in the destruction detection data 112a is executed before the actual program 112b.

Figure 10:
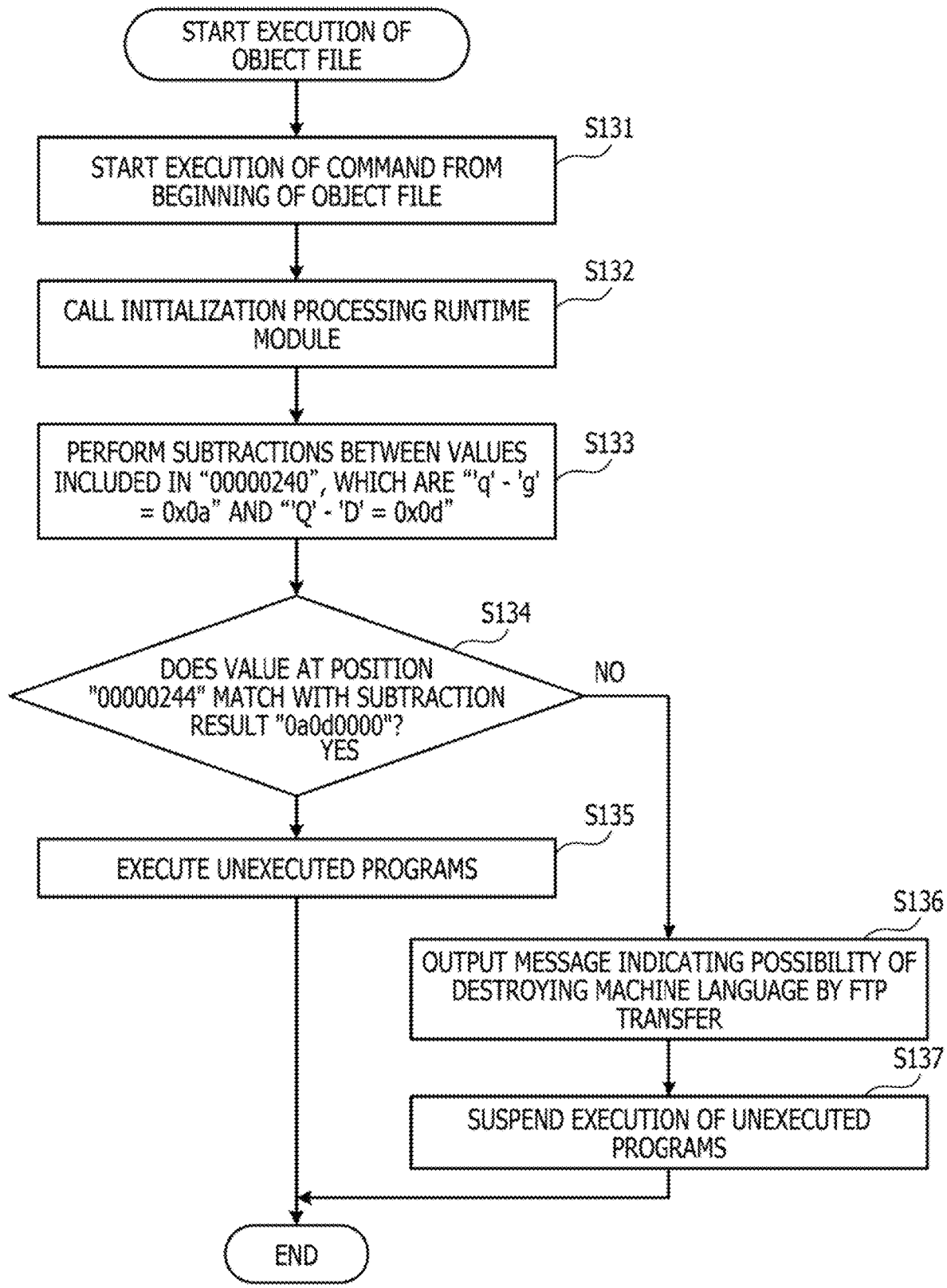
FIG. 10 is a diagram illustrating an example of a procedure of object file execution processing.

FIG. 10 is a diagram illustrating an example of a procedure of the object file execution processing. Hereinafter, processing illustrated in FIG. 10 will be described along step numbers. [0121] [Step S131] When an instruction to execute the object file 321 is input, the execution unit 330 starts execution of a command from the beginning of the object file 321.

[Step S132] The execution unit 330 calls the runtime module 322 in response to a call command for an initialization processing runtime.

[Step S133] Based on the runtime module 322, the execution unit 330 performs subtractions "'q'−'g'=0x0a" and "'Q'−'D'=0x0d" based on "71675144" described at the position "00000240" of the object file 321. That is, when the hexadecimal code "67" of the half-width "g" is subtracted from the hexadecimal code "71" of the half-width "q", the hexadecimal number "0a" is obtained. Similarly, when the hexadecimal code "44" of the half-width "D" is subtracted from the hexadecimal code "51" of the half-width "Q", the hexadecimal number "0d" is obtained.

[Step S134] The execution unit 330 determines whether the value at the position "00000244" and the subtraction result "a0d0000" match. If the value at the position "00000244" and the subtraction result "0a0d0000" match, the execution unit 330 advances the processing to step S135. If the value at the position "00000244" and the subtraction result "0a0d0000" do not match, the execution unit 330 advances the processing to step S136.

[Step S135] The execution unit 330 executes unexecuted programs (including the actual program 112b) in the object file 321. When the execution of all the programs in the object file 321 ends, the execution unit 330 ends the object execution processing.

[Step S136] The execution unit 330 outputs a message indicating possibility of destroying the machine language by the FTP transfer.

[Step S137] The execution unit 330 suspends the execution of the unexecuted programs (including the actual program 112b) in the object file 321, and ends the object execution processing.

As described above, the presence or absence of the destroy of the machine language in the object file 321 is detected. Hereinafter, with reference to FIG. 11 and FIG. 12, a difference in the destruction detection processing between the transfer in the binary mode and the transfer in the ASCII mode will be described.

Figure 11:
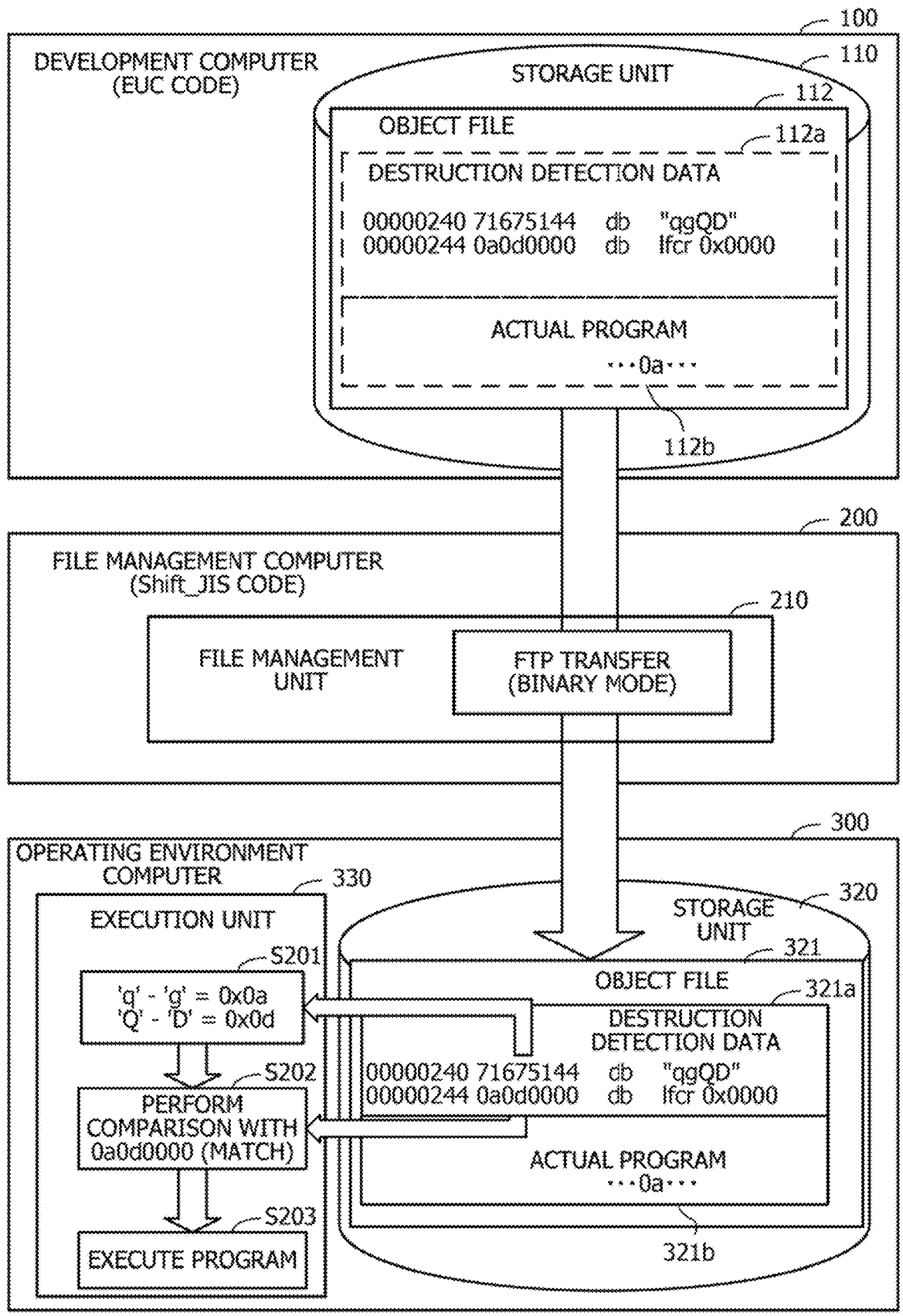
FIG. 11 is a diagram illustrating an example of destruction detection processing in a case of transfer in a binary mode.

FIG. 11 is a diagram illustrating an example of the destruction detection processing in the case of the transfer in the binary mode. In the file management computer 200, in the case where the object file 112 is transferred in the binary mode, the code conversion is not performed at the time of the transfer. Therefore, the carriage return code "0a" and the line feed code "0d" included in the destruction detection data 112a of the object file 112 before the transfer remain unchanged in destruction detection data 321a of the object file 321 after the transfer. Even in a case where the actual program 112b of the object file 112 before the transfer includes "0a" that matches the carriage return code, the code remains the same in an actual program 321b of the object file 321 after the transfer.

The execution unit 330 of the operating environment computer 300 generates the carriage return code "0a" and the line feed code "0d" by the subtractions "'q'−'g'=0x0a" and "'Q'−'D'=0x0d" (Step S201). The execution unit 330 then compares the code "0a0d0000" generated by the subtractions with the value "0a0d0000" at the position "00000244" in the object file 321 (step S202). In the example of FIG. 11, since the comparison results match, the execution unit 330 executes the remaining programs in the object file 321 (step S203).

Figure 12:
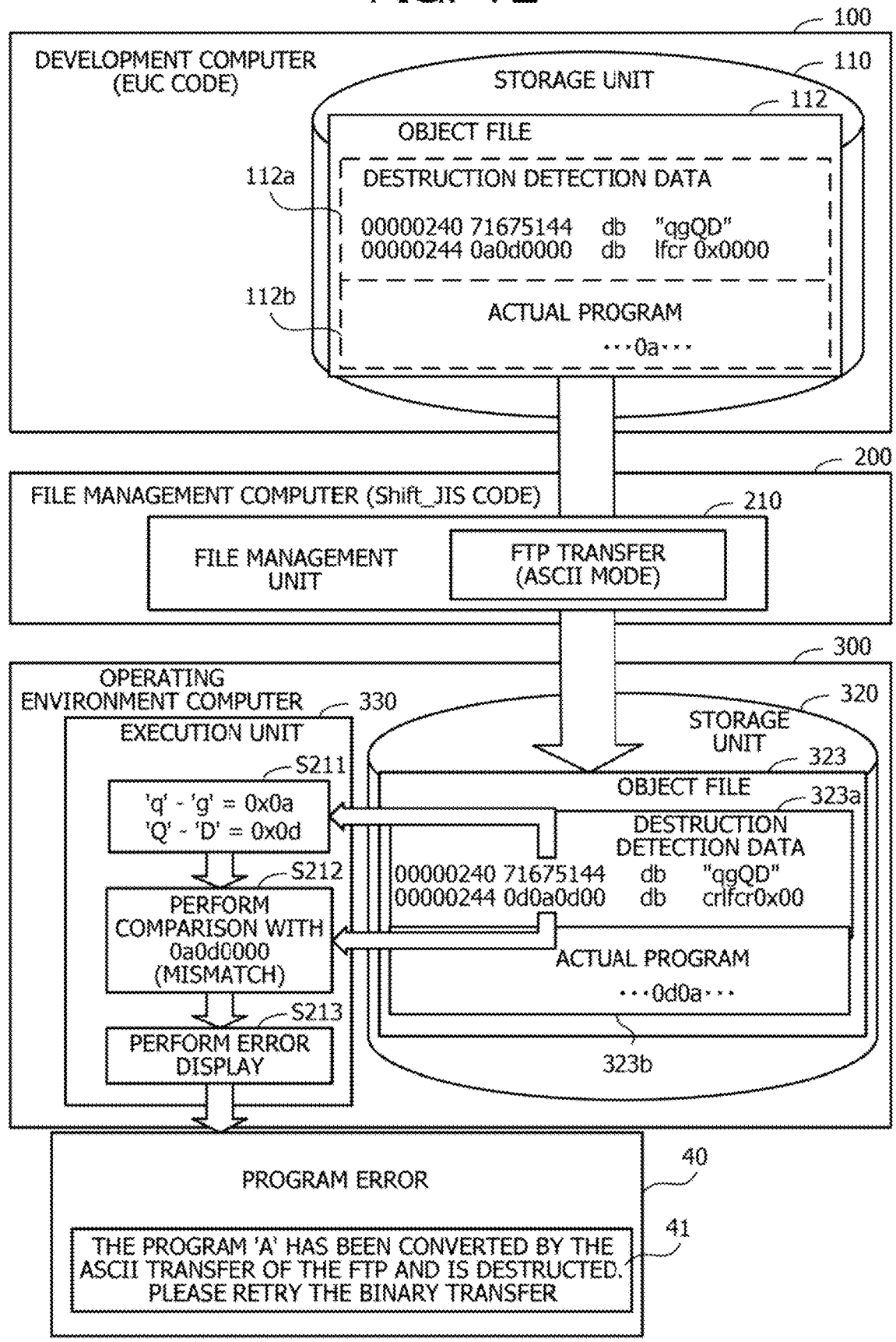
FIG. 12 is a diagram illustrating an example of the destruction detection processing in a case of transfer in an ASCII mode.

FIG. 12 is a diagram illustrating an example of the destruction detection processing in the case of the transfer in the ASCII mode. In the file management computer 200, in the case where the object file 112 is transferred in the ASCII mode, the code conversion is performed at the time of the transfer. Therefore, the carriage return code "0a" Included in the destruction detection data 112a of the object file 112 before the transfer is converted to "0d0a" in destruction detection data 323a of an object file 323 after the transfer. Even in a case where the actual program 112b of the object file 112 before the transfer includes "0a" that matches the carriage return code, the code is converted to "0d0a" in an actual program 323b of the object file 323 after the transfer.

The execution unit 330 of the operating environment computer 300 generates the carriage return code "0a" and the line feed code "0d" by the subtractions "'q'-'g'=0x0a" and "'q'-'D'=0x0d" (Step S211). The execution unit 330 then compares the code "0a0d0000" generated by the subtractions with the value "0d0a0d00" at the position "00000244" in the object file 323 (step S212). In the example of FIG. 12, the comparison results do not match. Therefore, the execution unit 330 performs error display without executing the remaining programs in the object file 323 (step S213).

For example, on a screen of an operating environment computer 40, a message 41 saying that "The Program 'A' has been converted by the ASCII transfer of the FTP and is destructed. Please retry the binary transfer" is displayed.

As described above, it is possible to automatically detect the destruction of the machine language that occurs at the time of the file transfer. As a result, it is easy to analyze a trouble caused by the destruction of the machine language.

Other Embodiments

In the second embodiment, the example of detecting the destruction of the machine language that occurs at the time of the file transfer between a computer with the EUC code system and a computer with the Shift_JIS code system has been shown, but the code system is an example, and the present invention can be similarly applied to computers of other code systems.

Furthermore, in the second embodiment, the machine language is destroyed by the file management computer 200 performing the code conversion, but another computer may destroy the machine language. For example, file transmission software in the development computer 100 may be erroneously set, and the development computer 100 may destroy the machine language of the object file. Furthermore, file reception software in the operating environment computer 300 may be erroneously set and the operating environment computer 300 may destroy the machine language of the object file.

In the second embodiment, the procedure of the destruction detection processing is described in the runtime module 322 prepared in advance in the operating environment computer 300, but the procedure of the destruction detection processing may also be described in the object file 112. For example, the compiler 130 can add a machine language program indicating the procedure of the destruction detection processing to the object file 112 when compiling the source file 111.

The embodiments have been illustrated as described above, but the configuration of each unit described in the embodiments may be replaced with another having a similar function. Furthermore, other arbitrary components and steps may be added. Moreover, any two or more configurations (features) of the above-described embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system, comprising:
a transmission device that includes a first memory and a first processor coupled to the first memory; and
a reception device that includes a second memory and a second processor coupled to the second memory,
wherein
the first processor is configured to:
generate second data by adding, to first data including a machine language, first machine language data that may be destroyed at a time of transfer of the first data and second machine language data that is not destroyed at the time of the transfer, and
transmit the second data, and
the second processor is configured to:
receive the second data,
determine whether the first data is destroyed based on a comparison result between the first machine language data and the second machine language data included in the received second data, and
inhibit execution of a machine language command in the first data included in the second data in a case where it is determined that the first data is destroyed.

2. The information processing system according to claim 1, wherein the second processor is configured to obtain the comparison result by comparing the first machine language data and data calculated based on a plurality of data included in the second machine language data.

3. The information processing system according to claim 1, wherein the first processor is configured to generate, in the second data, the second machine language data including, as the plurality of data, a first value and a second value whose difference from the first value is equal to a value of the first machine language data,
wherein the second processor is configured to obtain the comparison result by comparing the difference between the first value and the second value included in the second machine language data and the value of the first machine language data.

4. An information processing device, comprising:
a memory; and
a processor coupled to the memory and configured to:
receive second data from a transmission device configured to transmit the second data generated by adding, to first data including a machine language, first machine language data that may be destroyed at a time of transfer of the first data and second machine language data that is not destroyed at the time of the transfer, determine whether the first data is destroyed based on a comparison result between the first machine language data and the second machine language data included in the received second data, and inhibit execution of a machine language command in the first data included in the second data in a case where it is determined that the first data is destroyed.

5. A non-transitory computer-readable storage medium storing a program that causes a computer to execute a process, the process comprising:

receiving second data from a transmission device configured to transmit the second data generated by adding, to first data including a machine language, first machine language data that may be destroyed at a time of transfer of the first data and second machine language data that is not destroyed at the time of the transfer;

determining whether the first data is destroyed based on a comparison result between the first machine language data and the second machine language data included in the received second data; and inhibiting execution of a machine language command in the first data included in the second data in a case where it is determined that the first data is destroyed.

6. An information processing method executed by a computer, the information processing method comprising:

receiving second data from a transmission device configured to transmit the second data generated by adding, to first data including a machine language, first machine language data that may be destroyed at a time of transfer of the first data and second machine language data that is not destroyed at the time of the transfer; and determining whether the first data is destroyed based on a comparison result between the first machine language data and the second machine language data included in the received second data; and inhibiting execution of a machine language command in the first data included in the second data in a case where it is determined that the first data is destroyed.

* * * * *